United States Patent
Twu et al.

(10) Patent No.: US 7,463,670 B2
(45) Date of Patent: Dec. 9, 2008

(54) SPREAD SPECTRUM CODING METHOD AND APPARATUS THEREOF

(75) Inventors: Dsun-Chie Twu, Zhudong Township, Hsinchu County (TW); Hai-Wei Wang, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 767 days.

(21) Appl. No.: 10/765,154

(22) Filed: Jan. 28, 2004

(65) Prior Publication Data

US 2004/0184512 A1  Sep. 23, 2004

(30) Foreign Application Priority Data

Mar. 4, 2003  (TW) ................. 92104557 A

(51) Int. Cl.
 *H04B 1/00* (2006.01)
(52) U.S. Cl. ....................... 375/146; 375/282
(58) Field of Classification Search ......... 375/130–146, 375/282, 308, 295; 341/173, 55, 67–70
 See application file for complete search history.

(56) References Cited

U.S. PATENT DOCUMENTS

| | | | | |
|---|---|---|---|---|
| 4,573,034 A | * | 2/1986 | Schouhamer Immink | 341/95 |
| 4,606,052 A | * | 8/1986 | Hirzel et al. | 375/333 |
| 5,077,753 A | * | 12/1991 | Grau et al. | 375/141 |
| 5,157,686 A | * | 10/1992 | Omura et al. | 375/146 |
| 5,216,693 A | * | 6/1993 | Nakamura | 375/142 |
| 5,327,127 A | * | 7/1994 | May et al. | 341/102 |
| 5,438,589 A | * | 8/1995 | Nakamura | 375/145 |
| 5,640,413 A | * | 6/1997 | Ichihara | 375/130 |
| 7,133,698 B2 | * | 11/2006 | Miyoshi et al. | 455/562.1 |

FOREIGN PATENT DOCUMENTS

| | | |
|---|---|---|
| CN | 1155951 | 7/1997 |
| WO | WO 96/32784 | * 10/1996 |

* cited by examiner

*Primary Examiner*—David C. Payne
*Assistant Examiner*—Rahel Guarino
(74) *Attorney, Agent, or Firm*—Rabin & Berdo, P.C.

(57) ABSTRACT

A spread spectrum coding method. First, a data signal containing a DC component is encoded into an encoded data signal without any DC component. The encoded data signal excluding any DC component is then spread with a spreading code to generate a transmission signal, wherein the transmission signal does not contain any DC component. Furthermore, an alternative method is to spread a data signal with a spreading code to generate a transmission signal, wherein the data signals, spreading codes, and transmission signals all contain a DC component. The transmission signal is then encoded to remove the DC component.

7 Claims, 3 Drawing Sheets

SPREAD SPECTRUM CODING METHOD AND APPARATUS THEREOF

BACKGROUND OF THE INVENTION

1. Field of the Invention

The present invention relates to a spread spectrum coding method and a spread spectrum coding modulator thereof, and more particularly, to a method and a apparatus using the direct sequence spread spectrum (DSSS) technique.

2. Description of the Related Art

Generally speaking, the spread spectrum modulation technique is a method for modulating a signal that have a transmission bandwidth much larger than the original bandwidth of the signal.

FIG. 1 illustrates a transmitter of a conventional communication system implementing the base band direct sequence spread spectrum modulation. Direct sequence spread spectrum (DSSS) modulation is a spread spectrum modulation technique. In FIG. 1, a data signal b(t) is generated from a data source 102, and a spreading code c(t) is generated by a spreading code generator 104. The spreading code c(t) spreads the data signal b(t) using a spreader 106 to obtain a transmission signal m(t) as shown in the formula below.

$$m(t)=c(t)*b(t)$$

FIG. 2 illustrates a receiver of a conventional communication system implementing base band direct sequence spread spectrum modulation. A received signal r(t) received by the receiver is composed of the transmission signal m(t) sent from the transmitter and an interference signal i(t) as shown in the formula below.

$$r(t)=m(t)+i(t)$$

The received signal r(t) can be reconstructed to obtain the original data signal through demodulation. A demodulator mainly comprises a multiplier 202, an integrator 204, and a data wave detector 206. The multiplier 202 uses the same spreading code c(t) as the transmitter to demodulate the received signal r(t). The output of the multiplier 202 then is:

$$z(t)=c(t)*r(t)=c(t)*c(t)*b(t)+c(t)*i(t);$$

wherein $c(t)*c(t)=1$, therefore, $z(t)=b(t)+c(t)*i(t)$.

Apparently, the data signal b(t) is seen in the output signal of the multiplier 202, but with an extra interfering term c(t)*i(t). A low pass filter (i.e., the integrator) 204 with a pass band corresponding to the data signal b(t) is chosen to filter out the interfering term in that the data signal b(t) is a low frequency signal and c(t)*i(t) is a high frequency signal. Finally, the data signal b(t) can be recovered from the output of the data wave detector 206.

Spreading code c(t) is normally Pseudo random Noise (PN) sequences, and sequences generated using non-linear encoding techniques are usually preferred for acquiring better security. Some examples of spreading codes generated by non-linear encoding techniques are maximal codes, and gold codes. All spreading code sequences obtained from these encoding techniques have an odd number of bits in each spreading code. As a result, the number of 0s and that of 1s in the spreading code are always unequal to each other. That means, each spreading code has a direct current (DC) component and is not a DC-balanced sequence.

The receiver of the communication system using the DSSS modulation of the related art employs the heterodyne radio technique, i.e. the dual conversion technique. A major drawback of this structure is high cost. A lower cost alternative includes a direct conversion radio structure, which uses the DSSS modulation technique to modulate the data signal.

When implementing the direct conversion radio structure, DC offset compensation is required for that the circuit will generate additional direct current (DC). If the transmission signal comprises a DC component, the direct conversion radio structure has to determine precisely which portion of the DC component belongs to the transmission signal, and which portion is generated by the circuit. The DC component generated by the circuit tends to be affected by external factors, for example, time, supply voltage, and temperature, thus DC offset compensation needs to be dynamically performed. As a result, the conventional direct conversion radio structure cannot estimate the exact DC offset and provide accurate DC offset compensation.

SUMMARY OF THE INVENTION

Accordingly, the objective of the present invention is to provide a spread spectrum coding method for generating a transmission signal without any DC component from a spreading code with a DC component, which can be implemented in the direct conversion radio structure.

Another objective of the present invention is to provide a spread spectrum coding apparatus for a direct sequence spread spectrum (DSSS) communication system.

In order to achieve these objectives, the present invention provides a spread spectrum coding method. According to one embodiment of the present invention, the coding method first encodes a data signal to remove the DC component, then a transmission signal can be generated by multiplying the DC-removed data signal with a spreading code. As a result, any DC component is excluded from the transmission signal.

According to another embodiment, the present invention provides another spread spectrum coding method. A transmission signal including a DC component is generated by multiplying a data signal with a spreading code, wherein both the data signal and the spreading code include a DC component, respectively. The transmission signal is then encoded to remove the DC component before transmission.

According to yet other embodiments, the present invention further provides spread spectrum coding modulators comprising at least a data source, a spreading code generator, an encoder, and a spreader, for executing the two spread spectrum coding methods mentioned above, respectively.

These and other objectives of the present invention will be obvious to those of ordinary skill in the art after reading the following detailed description of the preferred embodiment, illustrated in the various Figures and drawings.

BRIEF DESCRIPTION OF THE DRAWINGS

The present invention will become more fully understood from the detailed description given herein and the accompanying drawings, given by way of illustration only and thus not intended to be limitative of the present invention.

DETAILED DESCRIPTION OF THE INVENTION

The present invention provides a coding method for generating a transmission signal without any DC component. By removing the DC component from the transmission signal, the operations of estimating DC voltage and performing DC offset compensation can be simplified.

Figure 1:
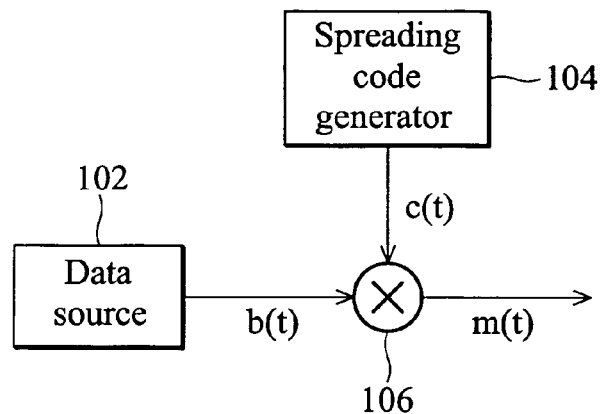
FIG. 1 is a diagram illustrating a transmitter of a conventional base band direct sequence spread spectrum communication system.
Figure 2:
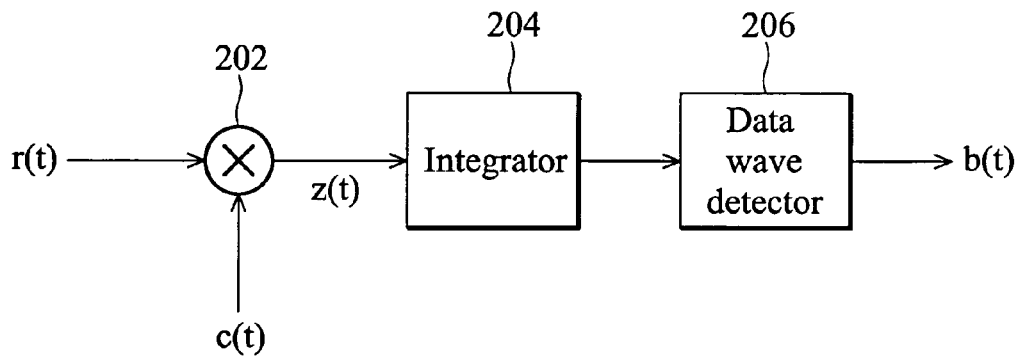
FIG. 2 is a diagram illustrating a receiver of a conventional base band direct sequence spread spectrum communication system.
Figure 3:
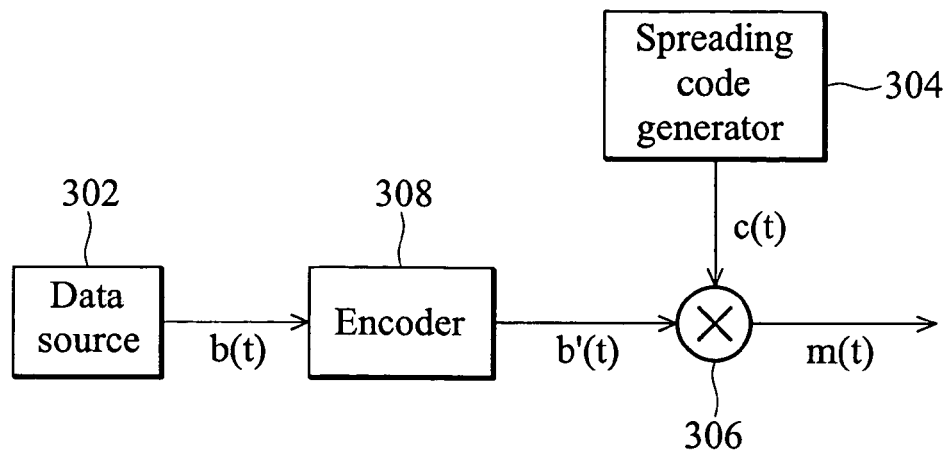
FIG. 3 is a conceptional diagram illustrating the spread spectrum coding method according to the first embodiment of the present invention.

FIG. 3 is a block diagram showing the first embodiment of the present invention. In FIG. 3, b(t) is a data signal generated from a data source 302. An encoder 308 coupled to the data source 302, encodes data signal b(t) output from the data source 302. The encoder 308 encodes the data signal b(t) into an encoded data signal b'(t), wherein the encoded data signal b'(t) is a signal excluding any DC component.

A variety of coding methods can be implemented by the encoder 308, for example, the Manchester coding method. A Manchester code sequence has the property of direct current balance. Thus, in the case when the encoder 308 is a Manchester encoder, the encoder 308 may invert the data signal b(t) and then append the inverted sequence after the original data signal b(t) to obtain the encoded data signal b'(t). For example, if the data signal b(t) is {1,0,0,1,1,0,0}, after Manchester coding, the encoded data signal b'(t) is {1,0,0,1,1,0,0,0,1,1,0,0,1,1}. The encoded data signal generated by the encoder 308 will have an equal number of 0s and 1s regardless of the composition of the data signal b(t). In the signal component aspect, the encoded data signal b'(t) after encoding excludes the DC component.

In addition to Manchester encoding, there are other encoding methods available to equalize the number of 0s and 1s. The same data signal b(t) {1,0,0,1,1,0,0} is used here for illustration purpose. The encoded data signal b'(t) can be encoded by appending the inverse sequence of the data signal to the original sequence of the data signal b(t), in this case, b'(t) will be {1,0,0,1,1,0,0,0,1,1,0,0,1,1}. The encoded data signal b'(t) can also be encoded by placing the inverse sequence of the data signal before the original sequence, so b'(t) becomes {0,1,1,0,0,1,1,1,0,0,1,1,0,0}. Another coding method is to invert the data signal b(t) first, then reverse the inverted sequence, and lastly insert data before or after the original sequence. The corresponding encoded data signal b'(t) will become {1,1,0,0,1,1,0,1,0,0,1,1,0,0} and {1,0,0,1,1,0,0,1,1,0,0,1,1,0} respectively.

Another coding method is assigning bits {1,0} to the encoded data signal b'(t) if the bit value in the data signal b(t) is {1}, and assigning bits {0,1} to the encoded data signal b'(t) if the bit value in the data signal b(t) is {0}. Accordingly, the data signal b(t) {1,0,0,1,1,0,0} will correspond to an encoded data signal b'(t) of {1,0,0,1,0,1,1,0,1,0,0,1,0,1}.

Yet another coding method is to add an extra bit to balance the numbers of 0s and 1s since the data signal b(t) is a signal with an odd number of bits. Similarly, the extra bit can be inserted before or after the original sequence of the data signal. The data signal b(t) {1,0,0,1,1,0,0} has three {1} and four {0}, so an extra {1} inserted in the encoded data signal can remove the DC component in that the signal will have equal numbers of 0s and 1s. The methods for encoding the data signal described above are examples, and thus not intended to limit the present invention. Any coding method that generates equal numbers of 0s and 1s in the encoded data signal b'(t), or in the signal composition aspect, removing the DC component after encoding should be included in the scope of the present invention.

A spreading code generator 304 generates a spreading code c(t), and the spreading code c(t) has an odd number of chips indicating that the signal contains a DC component. Subsequent to encoding, the encoded data signal b'(t) excludes the DC component. A spreader 306 performs direct sequence spread spectrum operation on the encoded data signal b'(t) with the spreading code c(t) to obtain a transmission signal m(t). As a result, the transmission signal m(t) will not have any DC component.

If the encoded data signal b'(t) generated from the encoder 308 has N bits, and the spreading coefficient of the spreading code is K, the transmission period of the transmission signal is K*N, and every bit in the data signal b(t) corresponds to K*N bits in the transmission signal m(t).

Figure 4:
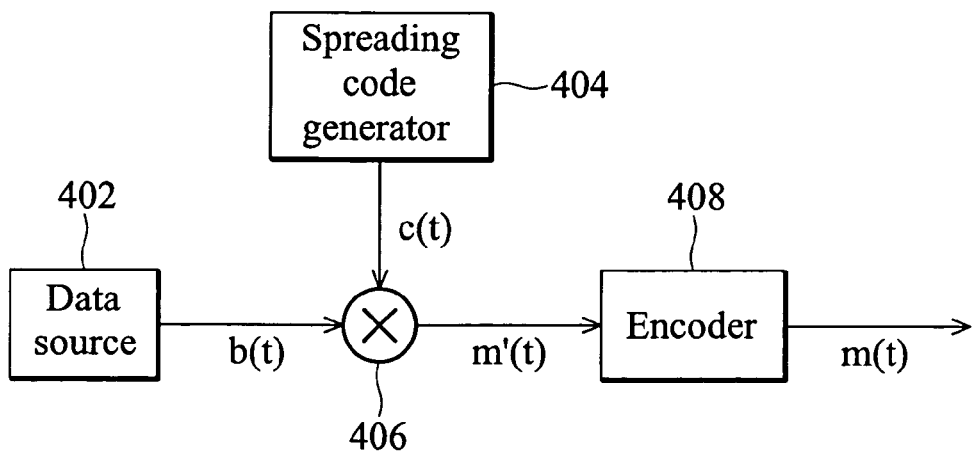
FIG. 4 is a conceptional diagram illustrating the spread spectrum coding method according to the second embodiment of the present invention.

FIG. 4 illustrates the second embodiment of the present invention. In FIG. 4, a data source 402 generates a data signal b(t), and a spreading code generator 404 generates a spreading code c(t). A spreader 406 spreads the data signal b(t) using the spreading code c(t), and obtains a transmission signal m'(t). The data signal b(t) and the spreading code c(t) both have a DC component, and therefore the transmission signal m'(t) after spreading may also include a DC component. The second embodiment is different from the first embodiment in that the encoder 408 is coupled to the spreader 406 in the second embodiment, while the encoder 308 is coupled to the data source 302 in the first embodiment. The encoder 408 of the second embodiment encodes the transmission signal m'(t) output from the spreader 406 to obtain an encoded transmission signal m(t), wherein the encoded transmission signal m(t) excludes a DC component.

In the present embodiment, the encoder 408 can be of a Manchester coding mechanism, or other coding mechanisms, similar to what is described concerning the encoder 308 in the first embodiment. The encoded transmission signal m(t) generated by the encoder 408 always has equal numbers of 0s and 1s, indicating that the DC component of the transmission signal m'(t) has been removed through encoding.

Figure 5:
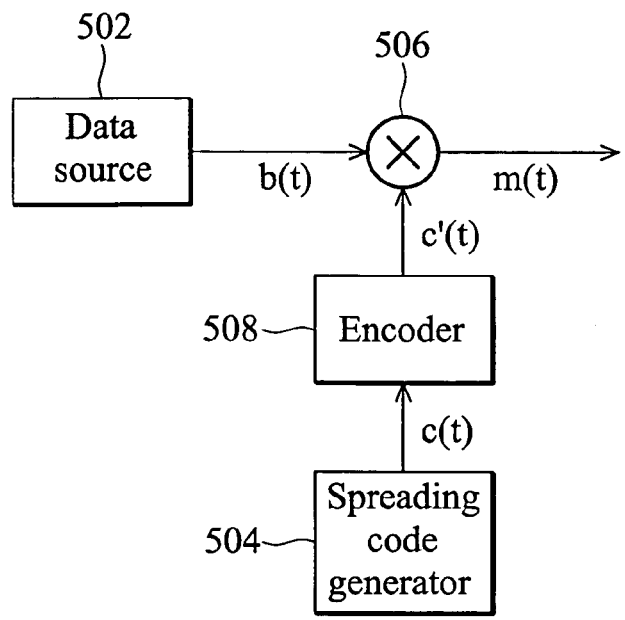
FIG. 5 is a conceptional diagram illustrating the spread spectrum coding method according to the third embodiment of the present invention.

FIG. 5 illustrates the third embodiment of the present invention. In FIG. 5, a data source 502 generates a data signal b(t), and a spreading code generator generates a spreading code c(t). The data signal b(t) and the spreading code c(t) both have a DC component. The present embodiment is different from the previous two embodiments in that an encoder 508 is coupled to the spreading code generator 504 for encoding the spreading code c(t) generated by the spreading code generator 504. The encoder 508 then outputs an encoded spreading code c'(t), wherein the spreading code c'(t) has N bits, and the numbers of 0s and 1s in the spreading code c'(t) are both equal to N/2. The encoded spreading code c'(t) output from the encoder 508 is a signal without any DC component. Furthermore, the encoded spreading code c'(t) retains the Pseudo random Noise (PN) property of the spreading code c(t).

A common spreading code is called the Barker code, wherein the sequence is {1,1,1,0,0,0,1,0,0,1,0}. In the present embodiment, the encoder 508 can be of a Manchester coding mechanism or other coding mechanisms, similar to what is described concerning the encoder 308 in the first embodiment. The encoder 508 encodes Barker code generated from the spreading code generator 504. Note that the coding method selected in the present embodiment outputs an encoded spreading code c'(t) without any DC component, as well as guarantees that the Pseudo random noise property of the spreading code is maintained in the encoded spreading code c'(t).

In addition to the previously discussed coding methods, another possible coding method is described in the following. Barker code is assumed to be the spreading code c(t) in this example. Barker code has 11 chips with six {0} and five {1}, and the code c(t) can remove the DC component by simply deleting one of the {0} in the spreading code c(t). For example, an encoded spreading code c'(t) with the sequence {1,1,1,0,0,0,1,0,0,1} is obtained by deleting the last chip of the Barker code. An encoded spreading code c'(t) obtained by this coding method has equal numbers of 0s and 1s, and still maintains the Pseudo random Noise property after encoding. The coding method is not limited to deleting only the last chip, but any chip in the code that will make the code have equal numbers of 0s and 1s may be deleted. This encoding method can also be combined with any coding method previously described. For example, after deleting one {0} chip, inversing the new sequence and inserting the inversed new sequence before or after the new sequence is also applicable.

A spreader 506 spreads the data signal b(t) according to the encoded spreading code c'(t) to generate a transmission signal m(t). The transmission signal m(t) will not have any DC component in that the encoded spreading code c'(t) does not have a DC component.

According to the three embodiments of the present invention, the transmission signal m(t) (or the encoded transmission signal m(t) in the second embodiment) will not include any DC component after spreading. In the direct conversion radio structure, removing the DC component of the transmission signal reduces the degree of difficulty in estimating DC offset and performing DC offset compensation when implementing the DSSS modulation technique.

Modulation techniques such as quadrature phase-shift keying (QPSK), binary phase-shift keying (BPSK), and minimum-shift keying (MSK) can be used to modulate the transmission signal in DSSS communication systems. The coding method and apparatus of the present invention can be implemented in various DSSS communication systems using different modulation techniques. A DSSS communication system using the BPSK modulation and utilizing the first embodiment of the present invention is described below.

Figure 6:
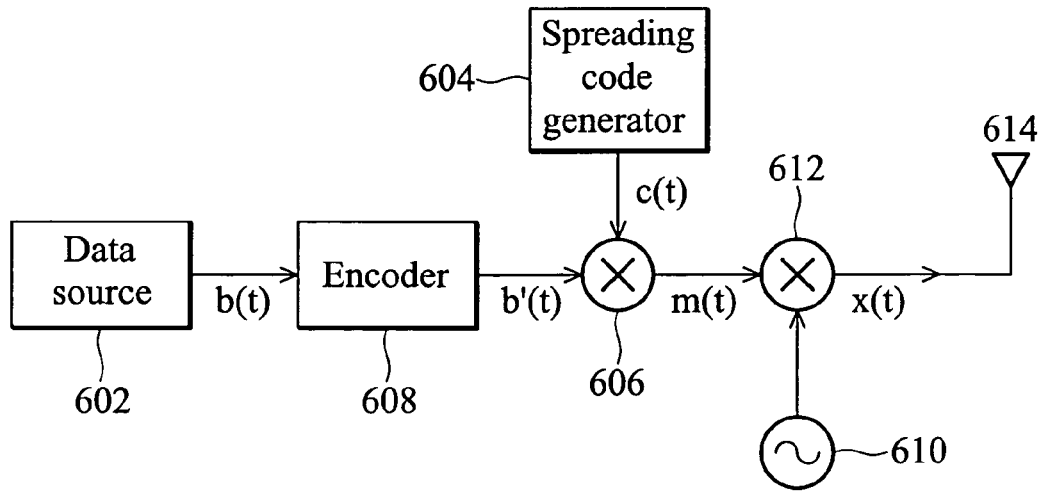
FIG. 6 is a block diagram illustrating the direct sequence spread spectrum (DSSS) system using binary phase shift-keying for modulation according to the first embodiment of the present invention.

FIG. 6 is a block diagram illustrating a DSSS system according to the first embodiment of the present invention using the BPSK modulation. As shown in the block diagram, a transmitter used in the DSSS communication system comprises a data source 602, a spreading code generator 604, a spreader 606, an encoder 608, a carrier generator 610, a BPSK modulator 612, and an antenna 614.

As earlier illustrated in the first embodiment, the transmission signal m(t) generated by the spreader 606 does not have a DC component. The carrier generator 610 generates a carrier wave, and the carrier wave is a sine wave in the DSSS communication system when using the BPSK modulation. The BPSK modulator 612 receives both the transmission signal m(t) from the spreader 606 and the carrier wave generated by the carrier generator 610, and modulates the transmission signal m(t) into a modulated signal x(t). The modulated signal x(t) is then sent to the antenna 614, and the antenna 614 transmits the modulated signal x(t) over a radio transmission channel.

As laid out above, the present invention provides a spread spectrum coding method and the transmitter thereof for generating a transmission signal after spectrum spreading, wherein the transmission signal excludes the DC component.

The foregoing descriptions of the embodiment of this invention has been presented for purposes of illustration and description. Obvious modifications or variations are possible in light of the above teaching. The embodiment was chosen and described to provide the best illustration of the principles of this invention and its practical application to thereby enable those skilled in the art to utilize the invention in varies applications. All such modifications and variations are within the scope of the present invention as determined by the appended claims when interpreted in accordance with the breadth to which they are fairly, legally, and equitably entitled.

What is claimed is:

1. An apparatus for encoding a data signal, comprising:
    a spreading code generator for outputting a spreading code, wherein the spreading code contains a direct current (DC) component;
    an encoder coupling to the spreading code generator, for encoding the spreading code and outputting an encoded spreading code, wherein the encoded spreading code is a first DC-balanced signal; and
    a spreader coupled to the encoder, for spreading the data signal according to the encoded spreading code, and outputting an output transmission signal to be transmitted through a communications medium to a receiver,
    wherein the output transmission signal is a second DC-balanced signal,
    wherein the spreading code is a Barker code, and the sequence of the Barker code is {1,1,1,0,0,0,1,0,0,1,0}, and
    wherein the encoded spreading code comprises an encoded Barker code, and the encoded Barker code is obtained by deleting one of the fourth, fifth, sixth, eighth, ninth, or eleventh bits of the Barker code.

2. The apparatus of claim 1, wherein the Manchester Code is used to encode the data signal.

3. The apparatus of claim 1 wherein the encoded spreading code comprises the spreading code and an inversion of the spreading code.

4. The apparatus of claim 1 wherein the encoded spreading code comprises the spreading code and a reversed inversion of the spreading code.

5. The apparatus of claim 1 wherein each bit in the spreading code corresponds to two bits in the encoded spreading code exclusively.

6. The apparatus of claim 1 wherein the spreading code is a Pseudo random Noise (PN) sequence.

7. The apparatus of claim 1 further comprising:
    a modulator for modulating the output transmission signal using a carrier wave to obtain a modulated signal; and
    an output device for outputting the modulated signal.

* * * * *